United States Patent
Johnson et al.

[11] Patent Number: 5,902,447
[45] Date of Patent: May 11, 1999

[54] DEFLASHING HEAD AND METHOD FOR JOINING PLASTIC EXTRUSIONS

[76] Inventors: Orin S. Johnson, Rte. 1, Box 95; Gary A. Jones, Rte. 1, Box 122, both of Hayfield, Minn. 55940

[21] Appl. No.: 08/832,438

[22] Filed: Apr. 3, 1997

Related U.S. Application Data

[63] Continuation of application No. 08/614,530, Mar. 13, 1996.

[51] Int. Cl.⁶ .................................................. B29C 65/14
[52] U.S. Cl. .................... 156/499; 156/433; 156/510; 156/556; 156/267; 156/304.2; 156/304.6; 156/309.9
[58] Field of Search ................................ 156/267, 304.2, 156/304.6, 309.9, 556, 499, 510, 433, 515

[56] References Cited

U.S. PATENT DOCUMENTS

| | | |
|---|---|---|
| 2,972,371 | 2/1961 | Hermann et al. . |
| 3,186,891 | 6/1965 | Gelling et al. . |
| 4,239,574 | 12/1980 | Aust et al. . |
| 4,640,732 | 2/1987 | Stafford . |
| 4,752,350 | 6/1988 | Schuster ............................ 156/499 X |
| 4,909,892 | 3/1990 | Quinn et al. . |
| 4,960,478 | 10/1990 | Newkirk et al. . |
| 4,995,935 | 2/1991 | Ganzberger . |
| 5,006,198 | 4/1991 | Pasquini . |
| 5,599,419 | 2/1997 | Hunter et al. . |

FOREIGN PATENT DOCUMENTS

| | | |
|---|---|---|
| 0 754 329 | 10/1970 | Belgium . |
| 2 088 220 | 3/1990 | Japan . |

*Primary Examiner*—Michael W. Ball
*Assistant Examiner*—Sam Chuan Yao
*Attorney, Agent, or Firm*—Merchant, Gould, Smith, Edell, Welter & Schmidt, P.A.

[57] ABSTRACT

An apparatus and method for creating a flash-free weld between the ends of thermoplastic members, wherein the members are held in position by holders, the ends of the members are softened by a heater, the members and holders are brought together until the ends of the members are joined to result in a flash-free weld.

14 Claims, 6 Drawing Sheets

DEFLASHING HEAD AND METHOD FOR JOINING PLASTIC EXTRUSIONS

This application is a continuation of application Ser. No. 08/614,530, filed on Mar. 13, 1996.

BACKGROUND OF THE INVENTION

1. Field of the Invention

This invention relates in general to an apparatus and process for welding thermoplastic members, and more particularly, to an apparatus and process for creating a flash-free weld.

2. Description of Related Art

In order to weld thermoplastic members, to be used in window or door frames, for example, machines are known in which the thermoplastic members are clamped, the ends of the members are softened by a heating plate, and the softened ends are joined. The resulting flash can be removed while the joint is still warm or machined off after the joint has cooled. If the flash is to be removed after the joint has cooled, the welded members are removed from the welding apparatus and then placed in a second machine in which a router, grinder, or knife blade is used to remove the flash. Depending on the profile of the member, e.g., the inside surface where the window glass will rest, an additional step of removing some of the flash by hand may be necessary. Still other systems choose to remove the flash from the entire profile by hand.

If the flash is removed while still warm, often deformation in the zone of the weld results. To prevent this deformation, other systems, such as that disclosed in U.S. Pat. No. 4,239,574, use a two-step process of first, pinching the flash, and second, manually dragging a scraper around the edges of the joint to remove the remaining flash. The '574 patent discloses a guide means to guide the scraper around the area of the weld, but the actual removal of the flash is not caused by the welding head, but by a manual scraper. All these systems require additional time, effort, and apparatus to remove the flash after the weld is formed.

SUMMARY OF THE INVENTION

To overcome the limitations in the prior art described above, and to overcome other limitations that will become apparent upon reading and understanding the specification, the present invention discloses an apparatus and process to create a flash-free weld for thermoplastic members.

The present invention solves the above-described problems by providing a welding apparatus with a cutting edge in the profile of the member that forcefully engages a planar surface, thus cutting off the flash without deforming the surface of the member.

A system in accordance with the principles of the present invention includes two holders, each securing a thermoplastic member, with the ends of the member protruding beyond the face of the holder, one of the holders having a cutting edge, wherein the ends of the members are softened by a heater and joined, forming flash, the flash being cut off by the cutting edge engaging the face of the other holder.

An alternative embodiment of the present invention is placing a cutting edge on the faces of both holders, such that members extruded from thicker thermoplastic may be joined and the flash removed.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the exemplary embodiments, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a welding and deflashing head with a cutting edge running completely along a profile of the members to be welded that forcefully engages a planar surface, thus cutting off the flash without deforming the surface of the members.

The welding and deflashing head comprises two holders. Each of the members to be welded is clamped in a holder with the end of the member extending slightly beyond the face of the holder. The holders are positioned with faces opposing one another and the ends of the members are softened by a heater. The holders are brought together so the ends of the members touch and are welded. One of the holders has a cutting edge integrally formed therewith, surrounding the opening through which the member is protruding. As the members are welded together, the cutting edge of the one holder engages the surface of the other holder, thus cutting off the flash that formed when the member ends were welded together. A flash-free weld is created without the use of an additional tool to remove the flash from the weld. The surface of the members in the area of the weld is not deformed when the cutting edge cuts the flash because the cutting edge and the openings in the holders are in the profile of the members. Since all the surfaces of the members are supported by the holders in the area of the weld, no deformation occurs as the ends of the members are pressed together and the cutting edge cuts the flash.

In accordance with the invention, an apparatus creates a flash-free weld when welding the ends of thermoplastic members. As embodied herein, and illustrated in the FIGS. an apparatus for creating a flash-free weld is shown generally at 50.

Figure 5:
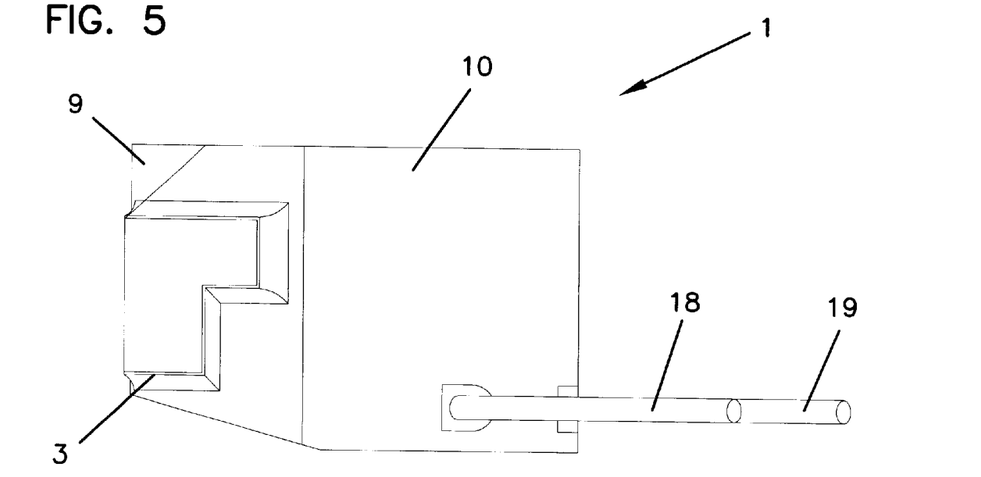
FIG. 5 is a side view of an embodiment of the deflashing head.

In accordance with the invention, the apparatus includes first and second holders constructed and arranged for holding members to be welded together. In the particular embodiment illustrated in FIG. 1, a first holder 1 and a second holder 2 are shown holding first and second members 4, 5 to be welded together. FIG. 5 illustrates a side view of the holder 1. In accordance with the invention, the first holder has a first planar face with a first opening shaped in the profile of the member, and the first opening is surrounded by a cutting edge protruding beyond the first planar face. As embodied herein and illustrated in FIG. 3, first holder 1 defines a first planar face 52. Along the surface of face 52 is an opening 25, shaped in the profile of first member 4. Completely surrounding the edge of opening 25 is a cutting edge 3. Cutting edge 3 engages holder 2 to cut off the flash from a weld between thermoplastic first and second members 4 and 5. Cutting edge is formed integrally with first holder 1. No attachment means are necessary, as the cutting edge is formed and sharpened unitary with first holder 1. As will be seen in the description which follows, this cutting edge completely surrounding the opening, in combination with the other features, functions to advantageously result in a weld with all of the flash removed. No extra steps must be performed or other tools used to remove flash, and result in a clean joint. It is contemplated by the inventors that in certain circumstances, depending on the particular application, it may not be necessary to remove the flash from all edges of the joint. In those cases, a cutting edge is only needed along the edge of the opening where is it necessary to cut off the flash.

Figure 4:
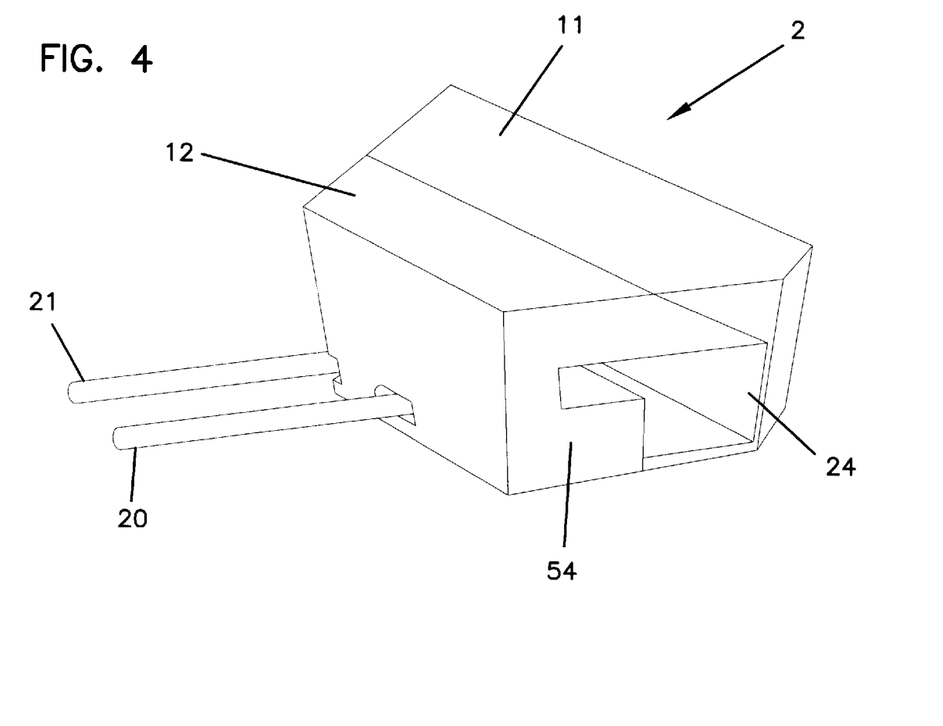
FIG. 4 is a perspective view of an embodiment the deflashing head without the cutting edge.

In accordance with the invention, the second holder includes a second planar face with a second opening shaped in the profile of the second member. As illustrated in the embodiment of FIG. 4, second holder 2 has a second planar face 54. A second opening 24 is defined by the surface of face 54. Second opening 24 is in the shape of a profile of second member 5.

Figure 1:
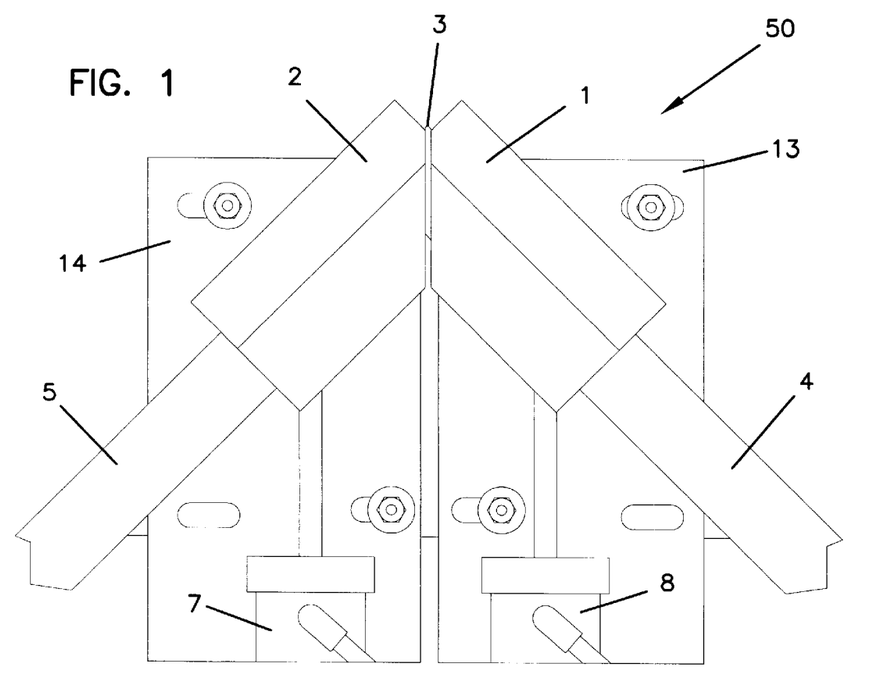
FIG. 1 is a top view of a preferred embodiment of the welding and deflashing head of this invention.
Figure 2:
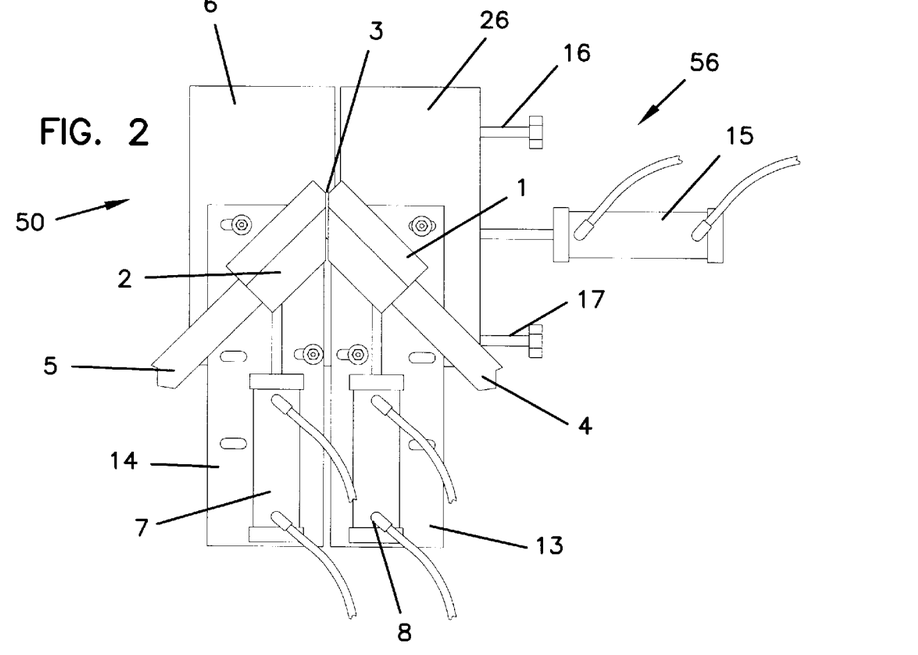
FIG. 2 shows a cutting position for a method of using the embodiment shown in FIG. 1.
Figure 9:
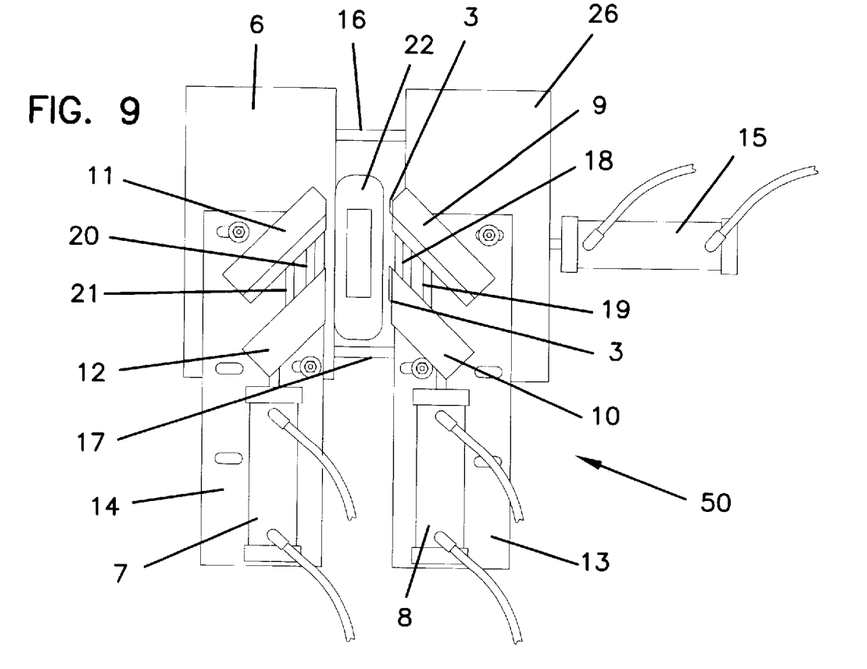
FIG. 9 shows a starting position for a method of using the apparatus shown in FIG. 1.
Figure 10:
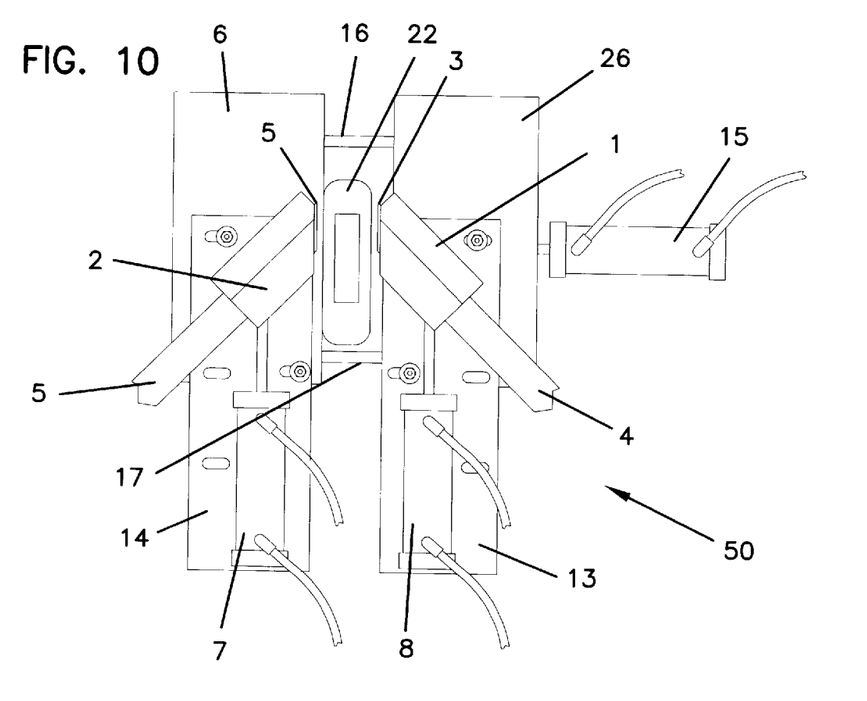
FIG. 10 shows a heating position for a method of using the apparatus shown in FIG. 1.

In accordance with the invention, the invention includes moving structure configured for moving the first and second holders toward and away from one another along linear paths between an open and closed position. It is envisioned by the inventors that the moving structure could be embodied in a wide variety of designs, provided that the first and second members are allowed to be first separate from each other while being heated and then moved together in order to be welded together. In one particular embodiment illustrated in the drawings, one moving structure is shown at 56 (FIG. 2). The moving structure 56 illustrated in this particular embodiment includes a piston 15 for moving the holder 1 towards the holder 2 by sliding a mounting plate 26 towards a mounting plate 6 along rods 16 and 17. The piston 15 may be hydraulically controlled or pneumatically controlled. Further, the inventors contemplate this may be manually operated, as well. Moving structure 56 moves the holder 1 and holder 2 between open and closed positions. One open position is illustrated in FIGS. 9 and 10. In the open position, first planar face 52 and second planar face 54 are parallel and spaced apart from one another. A closed position is illustrated in FIGS. 1 and 2. In the closed position, first planar face 52 and second planar face 54 remain parallel to each other, but cutting edge 3 engages the second planar face 54. As will be explained below, this results in a flash-free weld.

In accordance with the invention, first and second holders include first and second blocks for holding a member therein. As embodied herein and illustrated in FIG. 3, first holder 1 includes two sections, block 9 and block 10, which separate to accept first member 4 inside first holder 1. Second holder 2 includes two sections, block 11 and block 12, which separate to accept second member 5 inside second holder 2.

The invention includes mounting structure for slidingly mounting the blocks for movement toward and away from one another along linear paths between expanded positions, wherein the members are placed intermediate the blocks, and contracted positions, wherein the second block engages the first block fixably enclosing the members. In the particular embodiment shown in the drawings herein, block 10 is slidably mounted to the block 9 by mounting rods 18 and 19, which are urged together by piston 8. Block 12 is slidably mounted to the block 11 by mounting rods 21 and 20, which are urged together by piston 7. Pistons 7, 8 may be hydraulic or pneumatically controlled. The inventors contemplate a variety of other ways of slidingly mounting the blocks.

Figure 3:
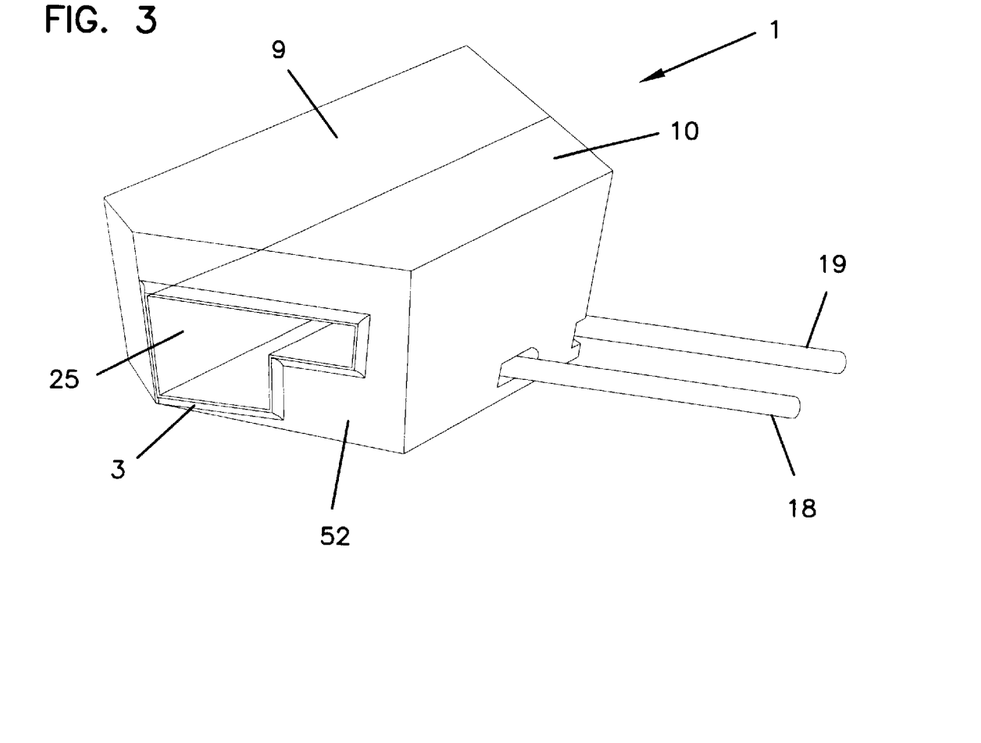
FIG. 3 is a perspective view of an embodiment of the deflashing head with the cutting edge.
Figure 11:
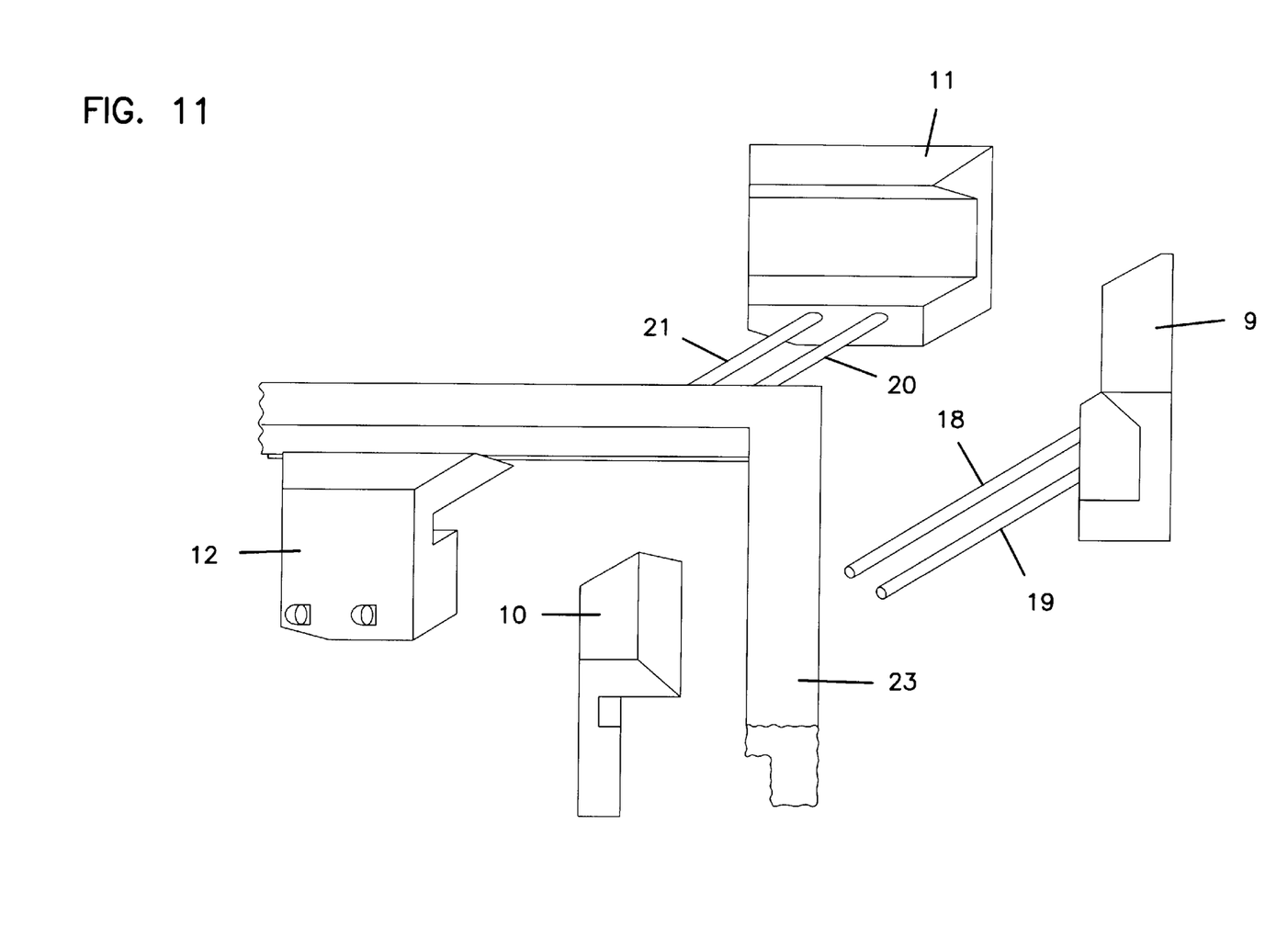
FIG. 11 shows an expanded view of the deflashing head.

FIGS. 3 and 4 show the holders 1 and 2, respectively, in clamped positions. FIG. 11 shows an expanded view of the holders 1 and 2. The blocks 9 and 10, including holder 1, and the blocks 11 and 12, including the holder 2, are in an expanded position, such that welded thermoplastic member 23, formed from welding the members 4 and 5 shown in FIG. 1, can be removed from the holders 1 and 2. The blocks 9 and 10 clamp the member 4 such that the opening created through the holder 1 is in the profile of member 4. The force exerted on the block 9 clamping the blocks 9 and 10 together is great enough that the member 4 cannot slide within the holder 1. The design of the holder 1 is such that when the holder is open, the blocks 9 and 10 separated, the member 4 can be inserted into the holder or the welded member 23 can be removed from the holder 1. When the members 4 and 5 are welded, the flash is removed by the cutting edge 3 on the holder 1, in FIG. 3, engaging the holder 2 on the planar surface surrounding the opening 24, in FIG. 4.

Figure 6:
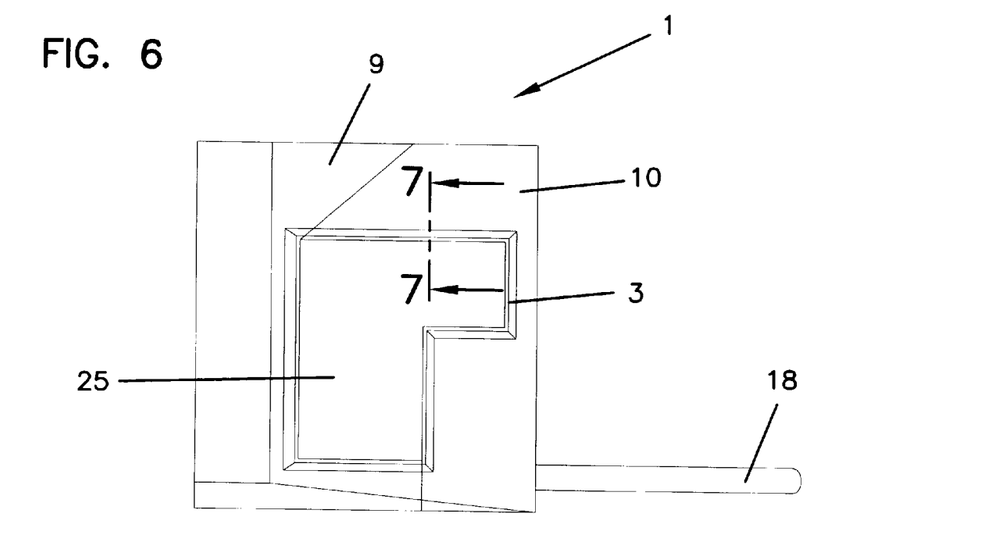
FIG. 6 is an end view of an embodiment of the deflashing head.

FIG. 6 is an end view of holder 1. The cutting edge 3 is on the face of the holder 1 and is in the profile of the member 4. The cutting edge 3 surrounds the opening 25 in the holder 1 that extends through the holder 1. In FIG. 4, the holder 2 has opening 24 on its face that extends Although the holder 2. The opening 24 is in the profile of the member 5.

Figure 7:
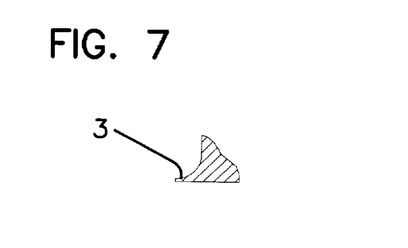
FIG. 7 shows a cross-section of the cutting edge of the FIG. 6 embodiment.

FIG. 7 shows a cross-section of the cutting edge 3 in FIG. 6. The cutting edge 3 extends approximately ⅛" beyond the face of the holder 1. Because the opening 24 in the holder 2, and the cutting edge 3 and the opening 25 in the holder 1, are in the profile of the members 4 and 5, deformation in the welded area is minimized because the shape of the softened ends of the members 4 and 5 is held intact as the cutting edge 3 pinches off the flash. Furthermore, with the shape of the cutting edge 3 and the openings 24 and 25 in the profile of the members 4 and 5, all the flash surrounding the weld is removed. No additional scraping is needed to remove the flash from interior surfaces of the welded member.

Because of the force necessary to clamp the members 4 and 5, it is recommended that the holders 1 and 2 be machined from steel and that the cutting edge 3 be made of tempered steel so the cutting edge 3 is sufficiently sharp and strong to cut the flash.

FIG. 11 shows the welded member 23 removed from the holders 1 and 2. The welded member 23 is not removed by separating the holders 1 and 2, as that would break the weld, but rather by opening the blocks 9 and 10, and 11 and 12. The blocks 9 and 10 are opened by the piston 8 and the blocks 11 and 12 are opened by the piston 7.

In accordance with the invention, the invention includes a method for removing the flash formed from welding together the ends of thermoplastic members to form a rigid joint. As embodied herein, one such method is illustrated in FIGS. 9, 10, and 2.

FIG. 9 shows the apparatus in the starting position with the holders 1 and 2 open and waiting to clamp the members 4 and 5. The holder 1 is made of the blocks 9 and 10 and the holder 2 is made of the blocks 11 and 12. The member 4 is placed between the block 9 and the block 10, and the member 5 is placed between the block 11 and the block 12. The members 4 and 5 are placed in the holders 1 and 2 with the ends of the members 4 and 5 extending approximately ⅛" beyond the face of the holders 4 and 5. The extended portion will form the weld. The block 9 is mounted to a mounting plate 13 and the block 11 is mounted to a mounting plate 14. The plates 14 and 13 are attached to plates 6 and 26, respectively. The blocks 10 and 12 are slidably attached to the blocks 9 and 11, respectively, by rods 18 and 19, and 20 and 21, respectively. The number of rods and orientation of the rods are determined by the size and shape of the member being welded and deflashed.

FIG. 10 illustrates the holders 1 and 2 clamping the members 4 and 5. After the member 4 is placed between the blocks 9 and 10, the piston 8 closes the holder 1 by sliding the block 10 along the rods 18 and 19 until the block 10 engages the block 9, thus clamping the member 4. After the member 5 is placed between the blocks 11 and 12, the piston 7 closes the holder 2 by sliding the block 12 along the rods 20 and 21 until the block 12 engages the block 11, thus clamping the member 5. The holders 1 and 2 are designed such that the opening through the holders 1 and 2 is in the profile of the members 4 and 5, thus stopping the members 4 and 5 from sliding when the members 4 and 5 are clamped in the holders 1 and 2.

After the members 4 and 5 are clamped in the holders 1 and 2, a heater 22 is raised between the ends of the members 4 and 5 to soften the ends. In one embodiment the heater 22, in the heating position, is intermediate the holders 1 and 2 and spaced a distance from the members 4 and 5 so that the heater 22 and members 4 and 5 are not touching, as illustrated in FIG. 10. Once the ends of the members 4 and 5 are softened, heater 22 is removed from between the ends of the members 4 and 5. While the ends of the members 4 and 5 are still soft, piston 15 moves the holder 1 towards the holder 2 by sliding mounting plate 26 towards mounting plate 6 along rods 16 and 17. In FIG. 2, after the holders 1 and 2 move together, the softened ends of the members 4 and 5 bond and form flash. The holder 1 has the cutting edge 3 that engages the holder 2. The impact of the cutting edge 3 engaging the face of the holder 2 removes the flash to create a flash-free weld. The inventors have discovered that this cutting edge 3 completely cuts off the flash from around the entire surface of the weld, solving a long-felt problem in the prior art. With the present invention, no additional scraping is needed to remove the flash. In other words, the cutting edge 3, by completely removing the flash, prevents having to perform the additional step of scraping off the flash.

The force exerted by the piston 15 must be great enough to have the cutting edge 3 cut the flash. The force exerted by the pistons 7 and 8 to keep the members 4 and 5 clamped in the holders 1 and 2 must be greater than the force exerted by the piston 15 when cutting the flash so the members 4 and 5 do not slide within holders 1 and 2.

Figure 8:
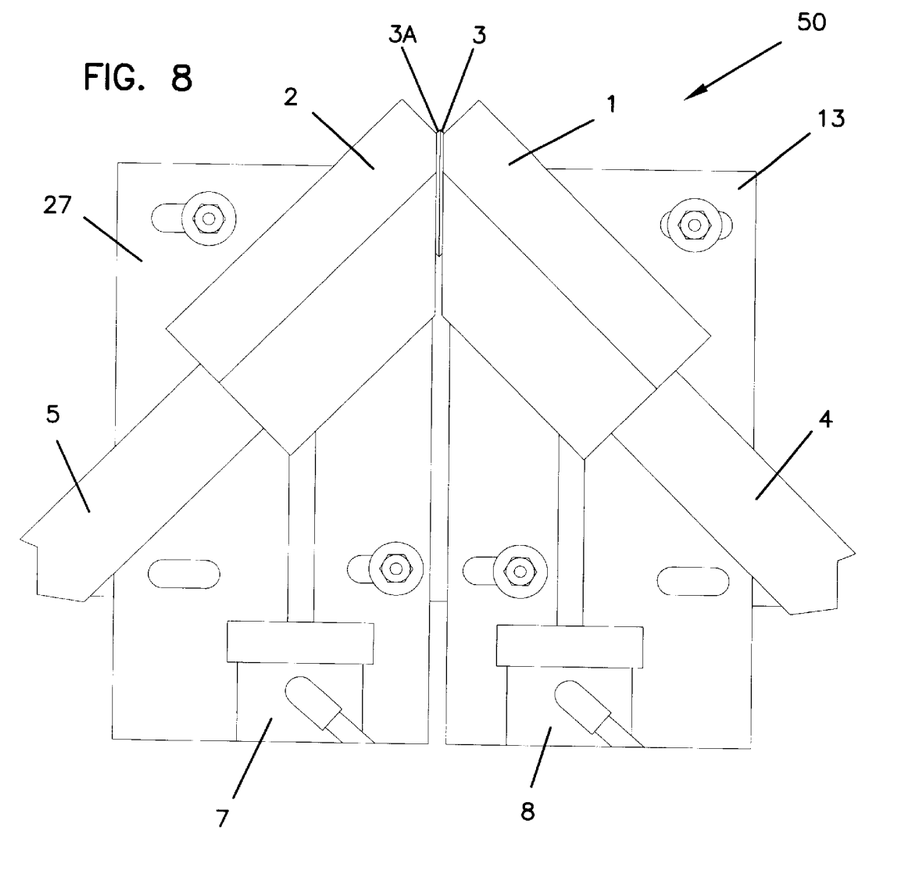
FIG. 8 shows an alternative embodiment of this invention with two cutting edges.

The gap between the face of the holder 1 and the face of the holder 2 when they are closed together is determined by the thickness of the cutting edge 3. The gap, and thus the thickness of the cutting edge 3, between the faces of the holders 1 and 2 needs to be wide enough such that when the cutting edge 3 impacts the holder 2 the flash is cut off and falls away. A larger gap is needed for thicker flash. Thicker flash could be formed if the members 4 and 5 are clamped with longer portions extending beyond the face of the holders 1 and 2, or if the members 4 and 5 are extruded from thicker thermoplastic. In this embodiment, recommended for 0.075" PVC members, the cutting edge 3 has a thickness of ⅛". The member 4 extends approximately ⅛" beyond the cutting edge 3. In order to accommodate thicker extrusions, a thicker cutting edge could be used or a cutting edge could be placed on both the holders 1 and 2. FIG. 8 shows an alternative embodiment in which the holder 2 has a cutting edge 3A. When the holders 1 and 2 are brought together, the cutting edge 3 engages the cutting edge 3A and the flash is removed.

It will be apparent to those skilled in the art that various modifications and variations can be made in the present invention and in construction of this without departing from the scope or spirit of the invention. As an example, the inventors contemplate that holders 1, 2 could be preheated, depending on the member to be welded. Holders 1, 2 would be heated by one of several means contemplated. For example, holes could be drilled in the holders and a heater coil inserted in the holes. Alternatively, the holders could be heated by direct current resistance. Several advantages are realized by preheating the holders. For example, preheating better ensures a strength in accordance to industry standards. Further, shorter cycle times would result.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

The above specification, examples and data provide a complete description of the manufacture and use of the composition of the invention. Since many embodiments of the invention can be made without departing from the spirit and scope of the invention, the invention resides in the claims hereinafter appended.

We claim:

1. An apparatus for creating a flash-free weld when welding ends of thermoplastic members comprising:
   (a) a first holder constructed and arranged for holding a first member; the first holder having a first face with a first opening shaped in a profile of the first member,
      (i) said first holder including a first cutting edge along at least a portion of said first opening; said first cutting edge protruding outwardly beyond said first face;
   (b) a second holder constructed and arranged for holding a second member to be joined; the second holder having a second face with a second opening shaped in a profile of the second member;

(c) moving structure configured for moving the first and second holders toward and a way from one another along paths between an open and closed position; the open position being when the first face and the second face are spaced apart from one another; and the closed position being when the first face and second face are parallel and the first cutting edge engages the second face; and (d) a heater for softening ends of the first and second members; the heater being movable toward and away from a heating position where the member ends are softened;
   (i) the heating position being: intermediate the first and second faces; and spaced from the ends of the first and second members a first distance when the first and second holders are in the open position.

2. An apparatus as recited in claim 1 wherein:
(a) said first cutting edge completely surrounds the first opening and protrudes beyond the first face.

3. An apparatus as recited in claim 1 wherein:
(a) the first holder further includes:
   (i) first and second blocks for holding the first member; and
   (ii) first mounting structure for slidingly mounting the blocks for movement toward and away from one another along linear paths between expanded positions, where the first member is placed intermediate the first and second blocks, and contracted positions, where the second block engages the first block fixably enclosing the first member.

4. An apparatus as recited in claim 3 wherein:
(a) the second holder further includes:
   (i) third and fourth blocks for holding the second member; and
   (ii) second mounting structure for slidingly mounting the third and fourth blocks for movement toward and away from one another along linear paths between expanded positions, where the second member is placed intermediate the third and fourth blocks, and contracted positions, where the third block engages the fourth block fixably enclosing the second member.

5. An apparatus as recited in claim 4 wherein:
(a) the first mounting structure includes:
   (i) first parallel mounting rods attached at a proximate end of the first block; the second block being slidably attached to the first mounting rods.

6. An apparatus as recited in claim 5 wherein:
(a) the second mounting structure includes:
   (i) second parallel mounting rods attached at a proximate end of the third block; the fourth block being slidably attached to the second mounting rods.

7. An apparatus as recited in claim 1 wherein:
(a) said first and second faces are planar.

8. An apparatus as recited in claim 2 wherein:
(a) said first holder and said first cutting edge comprise steel; and
(b) said second holder and said second cutting edge comprise steel.

9. An apparatus for creating a flash-free weld when welding ends of thermoplastic members comprising:
(a) a first holder constructed and arranged for holding a first member; the first holder having a first face with a first opening shaped in a profile of the first member;
   (i) said first holder including a first cutting edge along at least a portion of said first opening; said first cutting edge protruding outwardly beyond said first face;

(b) a second holder constructed and arranged for holding a second member to be joined; the second holder having a second face with a second opening shaped in a profile of the second member;
   (i) said second holder including a second cutting edge along at least a portion of said second opening; said second cutting edge protruding beyond the second face;

(c) moving structure configured for moving the first and second holders toward and away from one another along paths between an open and closed position; the open position being when the first face and the second face are spaced apart from one another; and the closed position being when the first face and second face are parallel and the first cutting edge engages the second cutting edge; and (d) a heater for softening ends of the first and second members; the heater being movable toward and away from a heating position where the member ends are softened;
   (i) the heating position being intermediate the first and second faces; and spaced from the ends of the first and second members a first distance when the first and second holders are in the open position.

10. An apparatus as recited in claim 9 wherein:
(a) said first cutting edge completely surrounds the first opening and protrudes beyond the first face; and
(b) said second cutting edge completely surrounds the second opening and protrudes beyond the second face.

11. An apparatus for joining the ends of two elongated thermoplastic members, comprising first and second holders constructed and arranged for holding the members to be joined, the first holder having a first face with a first opening shaped in the profile of the member formed therein; the first holder having a first cutting edge along a portion of the first opening and protruding beyond the first face; the second holder having a second face with a second opening shaped in the profile of the member formed therein, wherein the first and second holders are configured for securing the members with ends projecting beyond the first and second openings and with the ends facing one another;

means for mounting the holders for movement toward and away from one another along linear paths between open positions, wherein the first face and the second face are spaced apart from one another, and closed positions, wherein the first face and second face are parallel and the first cutting edge engages the second face;

a heater for softening the member ends, the heater being movable toward and away from a heating position intermediate and non-touching the ends of the thermoplastic members when the holders are in the open positions;

means for moving the heater to the heating position and for removing the heater from the heating position after softening the member ends; and means for moving the first and second holders to the closed positions to weld the softened member ends and to completely remove the flash when the first cutting edge engages the second face.

12. An apparatus as recited in claim 11 wherein:
(a) said first cutting edge completely surrounds the first opening.

13. An apparatus for joining the ends of two elongated thermoplastic members, comprising:

first and second holders constructed and arranged for holding the members to be joined, the first holder having a first face with a first opening shaped in the profile of the member formed therein; the first holder having a first cutting edge along a portion of the first opening and protruding beyond the first face; the second holder having a second face with a second opening shaped in the profile of the member formed therein; the second holder having a second cutting edge along a portion of the second opening and protruding beyond the second face; wherein the first and second holders are configured for securing the members with ends projecting beyond the first and second openings and with the ends facing one another;

means for mounting the holder for movement toward and away from one another along linear paths between open positions, wherein the first face and the second face are spaced apart from one another, and closed positions, wherein the first face and second face are parallel and the first cutting edge engages the second cutting edge;

a heater for softening the member ends, the heater being movable toward and away from a heating position intermediate and non-touching the ends of the thermoplastic members when the holders are in the open positions;

means for moving the heater to the heating position and for removing the heater from the heating position after softening the member ends; and means for moving the first and second holders to the closed positions to weld the softened member ends and to completely remove the flash when the first cutting edge engages the second cutting edge.

14. An apparatus as recited in claim 13 wherein:

(a) said first holder and said first cutting edge comprise steel; and (b) said second holder and said second cutting edge comprise steel.

* * * * *